United States Patent

Hartley

[15] 3,648,887
[45] Mar. 14, 1972

[54] UTENSIL ADAPTER ASSEMBLY

[72] Inventor: Robert L. Hartley, 12 S. Harding Street, Indianapolis, Ind. 46222

[22] Filed: Mar. 2, 1970

[21] Appl. No.: 15,608

[52] U.S. Cl. ........................220/94 R, 16/114 A, 16/116 R
[51] Int. Cl. ..................................................B65d 25/28
[58] Field of Search....................220/94 R; 16/114 A, 116 R

[56] References Cited

UNITED STATES PATENTS

| 3,143,759 | 8/1964 | Kennedy | 16/116 R |
| 1,900,565 | 3/1933 | Kircher | 16/114 A |
| 979,847 | 12/1910 | Hammond | 16/116 R |
| 2,501,940 | 3/1950 | Hibbard | 16/114 A |
| 3,157,909 | 11/1964 | Schmitt | 16/114 A |

*Primary Examiner*—M. Henson Wood, Jr.
*Assistant Examiner*—John J. Love
*Attorney*—Trask, Jenkins & Hanley

[57] ABSTRACT

A utensil and adapter assembly which will receive a handle and which has a flame guard fitted over its lower surface adjacent to the utensil and extending along a portion of the utensil adjacent to the lower surface of the adapter. The flame guard and the adapter are secured together and to the utensil by a fastener engaging a stud affixed to the utensil.

4 Claims, 5 Drawing Figures

PATENTED MAR 14 1972  3,648,887

INVENTOR.
ROBERT L. HARTLEY
BY
ATTORNEYS

UTENSIL ADAPTER ASSEMBLY

BACKGROUND OF THE INVENTION

This invention relates to a utensil adapter assembly and more particularly to a heat resistant adapter having a flame guard and which is attached to a utensil for releasably receiving a handle.

Utensils such as saucepans and frying pans and other common cooking utensils are intended to be subjected to open flame or resistance type heating often for long periods of time. Although the utensil itself is designed to withstand high temperatures and open flame, problems exist with respect to handles. Handles made from the same material as the utensil will withstand the effects of heat, but when hot, their utility as handles is greatly diminished. Although hot-pads may offer a partial solution, heat resistant handles are much more convenient and desirable. Removable handles are also desirable in order to reduce space requirements during cooking and storage, to provide a cooler handle for lifting a hot utensil, and for aesthetic purposes, particularly when the utensil is also used as a serving dish, as is often the case with casserole and other dishes.

By affixing one or more adapters to the outer wall of a utensil, handles can be inserted into the adapter whenever it is desired to lift the utensil. When the utensil is sitting on a hot burner or in a hot oven, the handles can be removed. The adapter, although of heat resistant material, is nevertheless subjected to the likelihood of charring or burning at its lower surface which is near to the heat source. A heat shield or flame guard is therefore desirable in order to protect the lower portions of the adapter.

The flame guard should afford complete protection to the lower portion of the adapter, including corners, and should be easy to attach and securely held in place. The adapter should be fitted simply and securely to the utensil and stabilized to prevent the utensil from wobbling when picked up, a dangerous condition when handling a utensil with hot contents. The adapter assembly means which is releasably engaged by the handle should also be firmly secured in place. These are some of the features present in this invention but absent from the prior art.

DESCRIPTION OF THE PRIOR ART

Utensil handles of heat resistant materials are well known, as are means for attaching handles to utensils. Various types of heat shields have also been proposed. Examples of these items may be found in U.S. Pat. Nos. 1,492,251; 2,595,361; 2,522,579; 2,787,805; 2,172,524 and 1,739,700.

SUMMARY OF THE INVENTION

This invention provides a heat resistant adapter which will releasably receive a handle and which has a fitted flame guard securely held in place to protect its entire lower surface, and which is easily and firmly secured and fitted to the utensil to prevent it from wobbling.

In one form of the invention, the adapter body has a first opening to receive a handle and a second opening to accommodate a stud which is affixed to a utensil. The body has a face adapted to be seated against the outer wall of the utensil. A flame guard is adapted to fit over the lower portion of the body adjacent to the outer utensil wall and the lower portion of the body face. An opening through the flame guard registers with the second body opening, and a fastener is adapted to be fitted into those openings and into engagement with the stud.

DESCRIPTION OF THE PREFERRED EMBODIMENT

Figure 1:
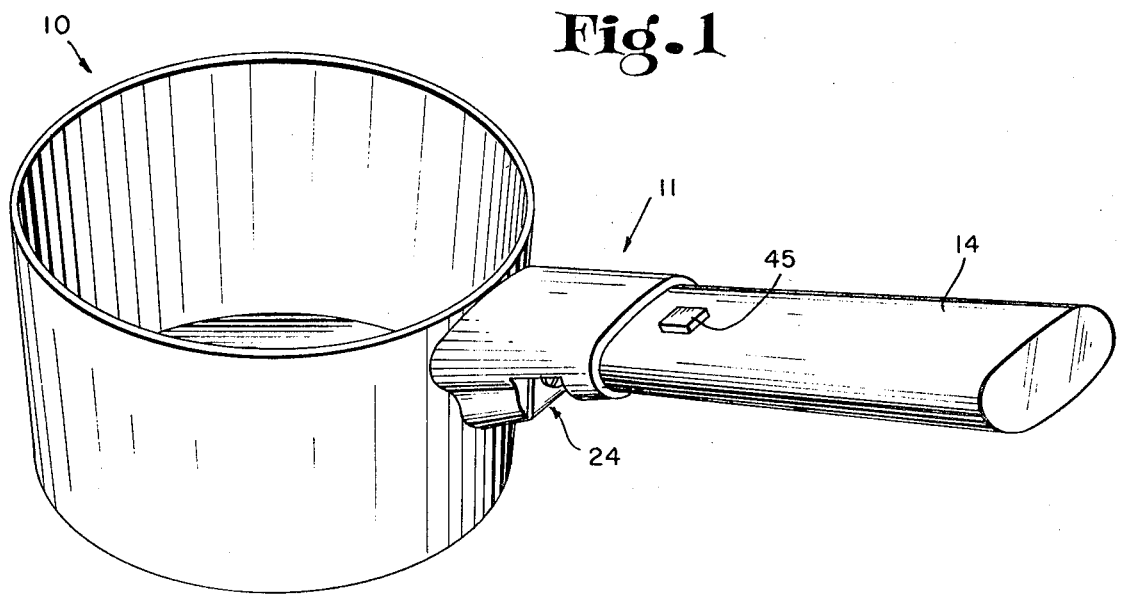
FIG. 1 is a perspective view of a utensil with an adapter affixed thereto and a handle received by the adapter.
Figures 2, 3:
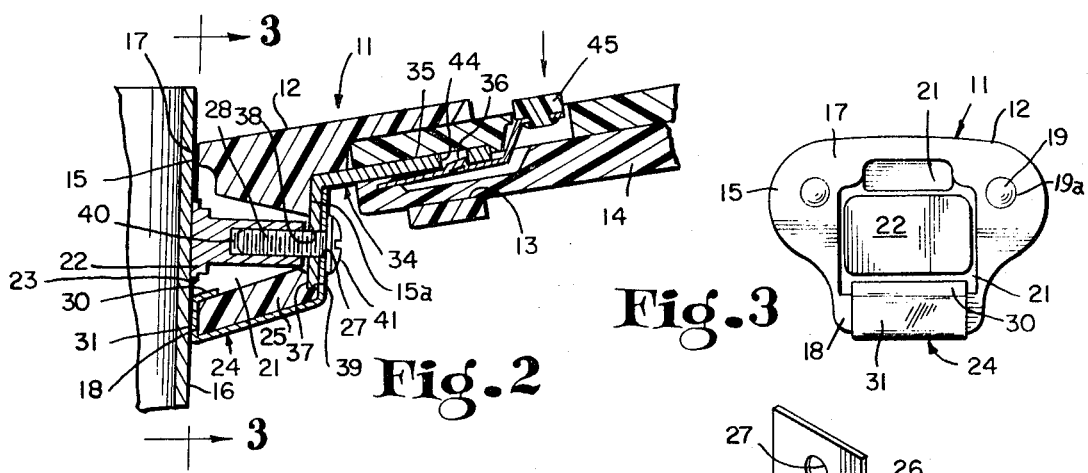
FIG. 2 is a fragmentary cross-sectional view of a utensil with an adapter affixed thereto and a handle received by the adapter.
FIG. 3 is a view taken along the line 3—3 of FIG. 2.

FIG. 1 illustrates a utensil 10, such as a saucepan, with an adapter 11 attached to it and a handle 14 received in the adapter. As best seen in FIGS. 2 and 3, the adapter 11 constitutes an assembly of elements, the most prominent of which is body member 12 which is composed of a heat resistant material such as Bakelite.

Body member 12 has a first opening 13 therein at its outer end which is adapted to releasably receive a portion of the handle 14. Handle 14 is also made of a heat resistant material. At its opposite or inner end, body 12 terminates in a face 15 having an upper portion 17 and a lower portion 18. Face 15 is adapted to be seated against the outer wall 16 of the utensil 10 by being contoured to conform to the shape of said wall. Body 12 has a second opening 21 extending therethrough. Opening 21 is larger on the face side of the body 12 and smaller on the opposite side 15a so as to accommodate therein a stud 22 permanently affixed to the outer utensil wall 16, as by welding, as indicated at 23.

A flame guard 24 (FIGS. 1 and 5) fits over the lower portion 25 of body 12. Flame guard 24 has a generally J-shaped outline and may, for example, be constructed of aluminum sheet 0.025 inch thick. Flame guard 24 is preferably of unitary construction in order to eliminate joints which may likely be vulnerable to heat penetration. The longer guard leg 26 has an opening 27 therethrough, and the shorter guard leg 31 has a flange 30 projecting inwardly toward the longer leg 26. The guard is designed to slidingly fit over lower portion 25 and lower face portion 18 of body 12, with flange 30 being received in the second opening 21 of body 12. The guard leg 31, like face 15, is contoured to conform to the curved shape of outer wall 16 of the utensil 10 so as to be seated against said wall 16. When so fitted, opening 27 will register with the opening 21 on the body side 15a.

A tongue 34 has a first portion 35 extending into first opening 13, and a second portion 37 extending along side 15a of body 12 and resting on a shoulder 39 formed by a projection on lower body portion 25. The second tongue portion 37 has an opening 38 therethrough which is in registry with opening 27 in the flame guard and the body opening 21 on side 15a. Portion 35 of the tongue has an opening 44 therethrough which may be engaged by a spring loaded button 36 in handle 14. Thus, when handle 14 is fully inserted into body opening 13, button 36 enters tongue opening 44 and there remains until released, as by pushing release button 45. In this manner, the handle 14 is firmly secured to the body member 12.

The stud 22 is internally threaded, as at 40. A threaded fastener 28 having a head 41 is passed through flame guard opening 27, tongue opening 38, and into engagement with the internally threaded stud 22 with the head 41 seating against the guard leg 26. In this manner, the body 12, flame guard 24, and tongue 34 are rigidly interconnected to each other and to utensil 10.

Figures 4, 5:
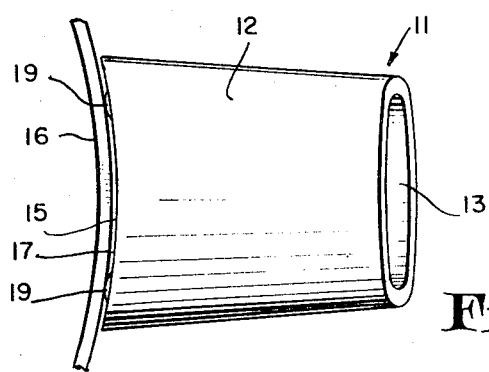
FIG. 4 is a fragmentary, enlarged view showing a part of the upper portion of the body of the adapter in contact with the utensil.
FIG. 5 is a perspective view of a flame guard.

As previously indicated, the face 15 is adapted to be seated against the utensil outer wall 16. Where the utensil has a flat outer wall, this presents no significant problem. Ordinarily, however, utensils such as pans have curved outer walls. Since it is most economical to produce adapter bodies in large quantities, it is desirable to provide a means to stabilize the adapters when they are used in situations where the body face does not precisely seat against the outer utensil wall. As illustrated in FIGS. 3 and 4, this problem is solved by providing projections or pins 19 fitted into indentations 19a which are formed in the upper face 17 of body 12. The pins 19 project only slightly from face 17 and will contact outer wall 16 to provide stability to the entire assembly even though the contours of the body face and the outer utensil wall are imperfectly mated.

I claim:

1. An adapter assembly for utensiles comprising a body member of heat resistant material having a first opening therein adapted to receive a handle and a face adapted to be seated against the outer wall of a utensil, said body having a second opening extending therethrough to accommodate a stud affixed to the utensil, a flame guard having angularly disposed larger and shorter legs, a flange projecting inwardly from said shorter leg, said flame guard being adapted to slidingly fit over the lower portions of said body and face with said flange being received in said second opening, said larger leg having an opening therethrough to register with said second opening in said body, and a fastener adapted to be fitted through said opening in said flame guard leg and into engagement with said stud.

2. The invention as set forth in claim 1 wherein the upper portion of said face is provided with an indentation adapted to receive a stabilizing pin which is adapted to engage said outer wall.

3. An adapter assembly for utensils comprising a body member of heat resistant material having a first opening therein adapted to receive a handle and a face adapted to be seated against the outer wall of a utensil, said body having a second opening extending therethrough to accommodate a stud affixed to the utensil, a flame guard adapted to fit over the lower portion of said body adjacent to said outer wall and the lower portion of said face, said flame guard having an opening therethrough to register with said second opening in said body, a tongue having a first portion received in said first opening and adapted to be releasably engaged by said handle, and a second tongue portion interposed between said body member and said flame guard, said second tongue portion having an opening therethrough in registry with said opening in said flame guard and said second opening in said body member, and a fastener adapted to be fitted through said opening in said flame guard and said opening in said second tongue portion and into engagement with said stud.

4. A utensil having an outer wall and an internally threaded stud affixed thereto, a heat resistant body member having a first opening therein, a second opening extending therethrough, and a face, said first opening being adapted to releasably receive a handle, said stud being received in said second opening, a flame guard extending along the lower surface of said body member adjacent to said outer wall and along said face adjacent to said lower surface of said body and having a flange projecting into said second opening, the lower portion of said face seating against said flame guard, the upper portion of said face having a plurality of indentations adapted to receive pins which engage said outer wall to provide stability, and a threaded fastener passing through an opening in said flame guard and into said stud for securing the adapter and flame guard to the utensil.

* * * * *